United States Patent [19]

Shinn, Jr.

[11] 4,099,695
[45] Jul. 11, 1978

[54] TRAILER SAFETY STAND

[75] Inventor: Robert C. Shinn, Jr., Hainesport, N.J.

[73] Assignee: Hollyford Enterprises, Inc., Hainesport, N.J.

[21] Appl. No.: 639,595

[22] Filed: Dec. 11, 1975

[51] Int. Cl.² .............................................. F16M 13/00
[52] U.S. Cl. ................................. 248/351; 248/119 S; 280/79.1 A; 16/44
[58] Field of Search .............................. 16/44; 182/15; 248/119 S, 351, 352; 254/1, DIG. 1, DIG. 4; 280/79.1, 150.5, 43.24

[56] References Cited

U.S. PATENT DOCUMENTS

| 2,456,218 | 12/1948 | Semisch | 280/79.1 A UX |
| 2,754,108 | 7/1956 | Brown | 254/1 X |
| 2,891,764 | 6/1959 | Pearne | 254/1 |
| 2,903,977 | 9/1959 | Ulinski | 248/352 X |
| 3,250,506 | 5/1966 | Thouvenelle et al. | 248/119 S |
| 3,286,298 | 11/1966 | Veary et al. | 16/44 |
| 3,392,944 | 7/1968 | Wyrough | 248/119 S |
| 3,568,607 | 3/1971 | Gutridge | 248/119 S |
| 3,837,675 | 9/1974 | Barnes et al. | 280/433 X |

FOREIGN PATENT DOCUMENTS 2,309,717  10/1973  Fed. Rep. of Germany ....... 248/352

Primary Examiner—Lawrence J. Staab
Attorney, Agent, or Firm—Brady, O'Boyle & Gates

[57] ABSTRACT

A safety stand for a trailer including a portable pedestal supported by a plurality of spring biased casters and have a top wall for supporting the nose of the trailer and provided with a recess for receiving the king-pin of the trailer.

3 Claims, 4 Drawing Figures

TRAILER SAFETY STAND

BACKGROUND OF THE INVENTION

In conventional tractor-trailer rigs, the trailer is provided with a king-pin whereby it may be connected to the fifth wheel of the trailer, and landing gear for supporting the trailer when the tractor is disconnected and removed therefrom, whereby the trailer is supported at one end by its rear wheels and at its other end by the landing gear. The trailer is usually loaded or unloaded with the trailer disconnected therefrom and oftentimes the support by the landing gear and the rear wheels of the trailer do not provide the required stability, particularly when a cargo handler, such as a fork lift truck, is employed in the trailer for handling the cargo.

After considerable research and experimentation, the safety stand of the present invention has been devised to provide the trailer with the necessary stabilization when disconnected from the trailer, and comprises, essentially, a portable pedestal supported by a plurality of spring biased casters. The upper end of the pedestal is provided with a top wall having a recess for receiving the trailer king-pin, whereby when placing the safety stand under the trailer the nose of the trailer rests on the top wall, and the king-pin of the trailer is inserted into the recess.

DESCRIPTION OF THE PREFERRED EMBODIMENT

Figure 1:
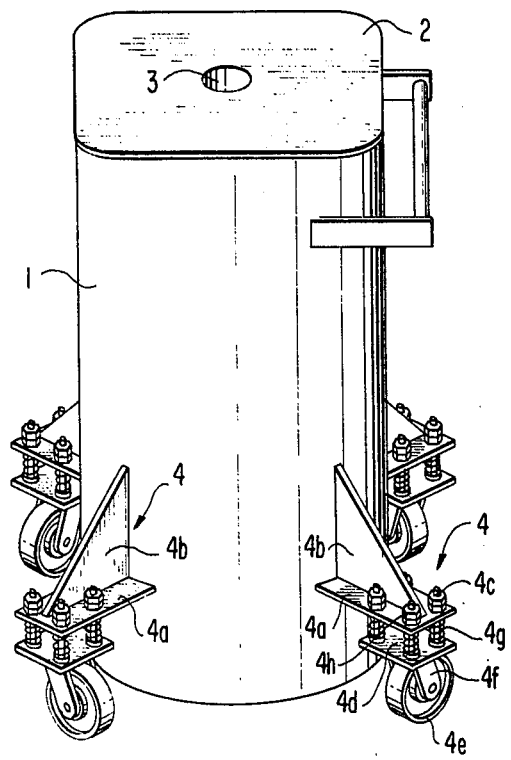
FIG. 1 is a perspective view of the safety stand of the present invention.
Figure 2:
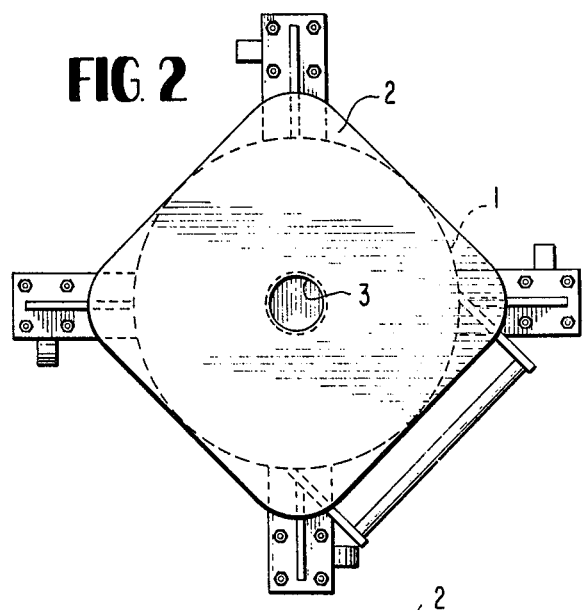
FIG. 2 is a top plan view of the safety stand.
Figure 3:
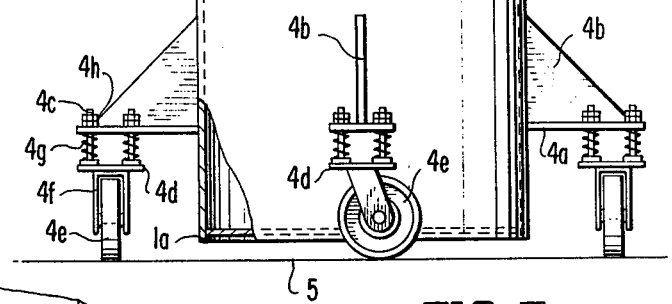
FIG. 3 is a fragmentary, side elevational view of the safety stand.

Referring to FIGS. 1 to 3, the trailer safety stand of the present invention comprises a pedestal 1 having a top wall 2 and a recess 3 for receiving the nose portion and king-pin of a trailer, to be described more fully hereinafter. The pedestal is rendered portable by means of a plurality of spring biased casters 4 secured to the side wall of the pedestal.

Each spring biased caster 4 comprises a radially outwardly extending arm 4a welded to the side wall of the pedestal and reinforced by a gusset plate 4b welded to the side wall of the pedestal and the upper surface of the arm 4a. The arm 4a is provided with a plurality of apertures for rotatably and slidably receiving the upper end portions of a plurality of bolts 4c having their lower ends rigidly connected to a plate 4d to which a wheel 4e is secured through a bifurcated arm 4f. Each bolt 4c extends through a coil tension spring 4g, the tension of which can be adjusted by nuts 4h threaded on the upper end of the bolt. By the construction and arrangement of the spring biased casters, the pedestal is biased upwardly so that the bottom edge thereof 1a (FIG. 3) is raised from the ground 5.

To facilitate the manipulation of the safety stand, a suitable handle 6 is provided on the side wall of the pedestal.

Figure 4:
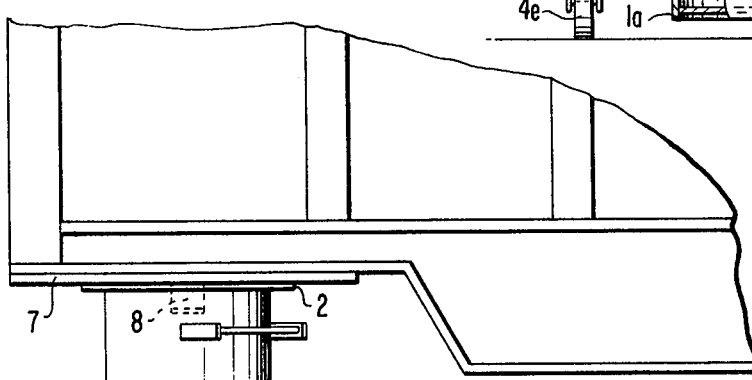
FIG. 4 is a fragmentary, side elevational view of the stand in operative position underneath the nose of a trailer.

In the operation of the safety stand, referring to FIG. 4, the pedestal is wheeled underneath the nose 7 of a trailer and the recess 3 is located or aligned with the king-pin 8 of the trailer. With the trailer thus positioned, the landing gear of the trailer is elevated allowing the trailer nose 7 to rest on and be supported by the top wall 2a of the pedestal while the trailer king-pin 8 simultaneously is received in the recess 3. The weight of the trailer pushes the pedestal downwardly, thus compressing springs 4g until the lower edge 1a of the pedestal engages the ground. If desired, the trailer landing gear may then be lowered to further enhance the stability of the trailer.

As will be seen in FIG. 3, the recess 3 for receiving the trailer king-pin is formed as a cup which can contain a suitable lubricant such as grease, whereby the trailer king-pin may become lubricated while being supported by the pedestal, to thereby facilitate its connection with the tractor fifth wheel when subsequently connected thereto.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A mobile safety stand for temporarily supporting a conventional trailer having a king-pin and landing gear comprising, a pedestal, wheel means mounted on the lower end of said pedestal, a handle connected to said pedestal whereby the pedestal is manually movable to a position under the nose portion of a trailer, a top wall integrally connected to the upper end of the pedestal, an unobstructed recess provided in said top wall for freely receiving and releasing the trailer king-pin in a substantial vertical direction, said recess aligning the trailer king-pin with the top wall of the pedestal, whereby the nose portion of the trailer is supported on the top wall of the pedestal when the trailer landing gear is elevated, and a lubricant contained within said recess whereby the king-pin becomes lubricated while seated therein to thereby facilitate its connection with a tractor fifth wheel when subsequently connected thereto.

2. A safety stand according to claim 1 wherein the recess is formed as a cup.

3. A safety stand according to claim 1, wherein the wheel means comprises a plurality of radially extending arms secured to the side wall of the pedestal, each arm having a plurality of bolts extending normal thereto and rotatably and slidably mounted therein, a wheel assembly connected to the bolts, and tension springs mounted between the lower surface of the arm and the wheel assembly, whereby the lower end of the pedestal is normally held in an elevated position above the ground but movable to engage the ground when the pedestal is in the supporting position under the nose of the trailer.

* * * * *